(12) United States Patent
Xian et al.

(10) Patent No.: US 9,886,160 B2
(45) Date of Patent: Feb. 6, 2018

(54) MANAGING AUDIO AT THE TAB LEVEL FOR USER NOTIFICATION AND CONTROL

(71) Applicant: Google Inc., Mountain View, CA (US)

(72) Inventors: Shijing Xian, Mountain View, CA (US); Serge Lachapelle, Stockholm (SE); Yuri James Wiitala, Kirkland, WA (US); Jiao Yang Lin, Kirkland, WA (US); Hin-Chung Lam, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 321 days.

(21) Appl. No.: 13/843,721

(22) Filed: Mar. 15, 2013

(65) Prior Publication Data

US 2014/0281983 A1  Sep. 18, 2014

(51) Int. Cl.
G06F 3/0482 (2013.01)
G06F 3/0481 (2013.01)
G06F 3/16 (2006.01)
G06F 3/0483 (2013.01)
G06F 3/0484 (2013.01)

(52) U.S. Cl.
CPC .......... G06F 3/0481 (2013.01); G06F 3/0483 (2013.01); G06F 3/0484 (2013.01); G06F 3/167 (2013.01)

(58) Field of Classification Search
CPC .... G06F 3/0481; G06F 3/0483; G06F 3/0484; G06F 3/167
See application file for complete search history.

(56) References Cited

U.S. PATENT DOCUMENTS

| | | | | |
|---|---|---|---|---|
| 4,024,505 A | * | 5/1977 | Sperling | G06F 13/26 710/2 |
| 5,627,655 A | * | 5/1997 | Okamoto | G11B 20/00086 380/203 |
| 5,960,151 A | * | 9/1999 | Takahashi | H04N 5/913 360/15 |
| 6,122,434 A | * | 9/2000 | Sawabe | G11B 27/105 386/244 |
| 6,480,191 B1 | * | 11/2002 | Balabanovic | G06F 3/0481 345/419 |
| 6,778,639 B2 | * | 8/2004 | Gusler | H04M 1/6505 379/68 |

(Continued)

FOREIGN PATENT DOCUMENTS

JP  2009123165 A  6/2009
WO  2014/150212 A1  9/2014

OTHER PUBLICATIONS

"Issue U.S. Appl. No. 12/328,027: Audio Indicator in Each Tab—Code Review", retrieved on Jun. 16, 2014 from https://codereview.chromium.org/12328027/, Feb. 21, 2013, 2 pages.

(Continued)

*Primary Examiner* — Jung-Mu Chuang
(74) *Attorney, Agent, or Firm* — Brake Hughes Bellermann LLP

(57) ABSTRACT

According to one general aspect, a method may include executing, by a processor of a computing device, at least a portion of an application that includes a plurality of tabs, each tab associated with a respective document that is configured to be rendered for display by the application. The method may also include determining a particular tab of the plurality of tabs that is recording an audio and/or visual signal derived from an environment of the computing device. The method may further include providing a graphical indication, associated with the particular tab, that indicates to a user of the computing device that the particular tab is recording the audio and/or visual signal.

19 Claims, 8 Drawing Sheets

(56) References Cited

U.S. PATENT DOCUMENTS

| | | | | |
|---|---|---|---|---|
| 6,804,454 B2* | 10/2004 | Ogino | H04N 5/913 | 386/248 |
| 6,816,904 B1* | 11/2004 | Ludwig | H04M 3/567 | 348/E7.081 |
| 6,988,205 B2* | 1/2006 | Walker | H04K 1/00 | 379/67.1 |
| 6,996,545 B1* | 2/2006 | Nagai | G11B 19/122 | 360/15 |
| 7,535,996 B2* | 5/2009 | Turner | H04M 1/21 | 379/114.1 |
| 7,623,766 B2* | 11/2009 | Ando | G11B 27/034 | 386/239 |
| 7,738,638 B1* | 6/2010 | Henderson | H04M 3/42221 | 370/354 |
| 7,934,251 B2* | 4/2011 | Hesselink | H04L 63/0209 | 707/609 |
| 8,085,632 B2* | 12/2011 | Miyazaki | G11B 7/28 | 369/47.12 |
| 8,258,964 B2* | 9/2012 | Buchnick | A61B 5/1117 | 340/573.1 |
| 8,265,928 B2* | 9/2012 | Kristjansson | G10L 21/0208 | 704/226 |
| 8,280,014 B1* | 10/2012 | Bowerman | H04M 3/53383 | 370/352 |
| 8,375,414 B2* | 2/2013 | Covey | H04L 12/1827 | 725/105 |
| 8,448,059 B1* | 5/2013 | Dodrill | H04L 67/02 | 715/205 |
| 8,468,201 B2* | 6/2013 | Dasilva | G06F 17/3082 | 709/203 |
| 8,495,678 B2* | 7/2013 | Perlman | A63F 13/12 | 463/42 |
| 8,499,253 B2* | 7/2013 | Liu | G06F 3/0483 | 715/777 |
| 8,675,837 B2* | 3/2014 | Walker | H04K 1/00 | 379/93.01 |
| 8,818,175 B2* | 8/2014 | Dubin | H04N 9/87 | 386/282 |
| 8,953,756 B2* | 2/2015 | Berstis | H04L 65/1073 | 370/352 |
| 9,007,302 B1* | 4/2015 | Bandt-Horn | G06F 3/0202 | 345/156 |
| 9,117,483 B2* | 8/2015 | Zaletel | G11B 27/034 | |
| 9,137,346 B2* | 9/2015 | Maggenti | H04M 1/656 | |
| 9,392,037 B2* | 7/2016 | Hyndman | H04L 65/4015 | |
| 9,472,191 B2* | 10/2016 | Hussain | H04W 4/023 | |
| 9,524,651 B2* | 12/2016 | Fix | G09B 5/12 | |
| 9,693,233 B2* | 6/2017 | Ward | H04W 12/08 | |
| 9,712,579 B2* | 7/2017 | Gottlieb | H04L 65/403 | |
| 2002/0061185 A1* | 5/2002 | Hirabayashi | G11B 15/023 | 386/243 |
| 2003/0031107 A1* | 2/2003 | Horii | G11B 19/122 | 369/53.21 |
| 2003/0115451 A1* | 6/2003 | Walker | H04K 1/00 | 713/153 |
| 2004/0101282 A1* | 5/2004 | Kuroda | G11B 19/02 | 386/260 |
| 2004/0225502 A1* | 11/2004 | Bear | G10L 15/26 | 704/270 |
| 2004/0249776 A1* | 12/2004 | Horvitz | G06Q 10/109 | 706/21 |
| 2005/0163291 A1* | 7/2005 | Turner | H04M 1/21 | 379/88.17 |
| 2005/0265554 A1* | 12/2005 | Walker | H04K 1/00 | 380/283 |
| 2006/0020538 A1* | 1/2006 | Ram | G06Q 30/0222 | 705/37 |
| 2006/0198504 A1* | 9/2006 | Shemisa | H04M 3/2281 | 379/201.02 |
| 2006/0230356 A1* | 10/2006 | Sauve | G06F 3/0481 | 715/777 |
| 2007/0036330 A1* | 2/2007 | Wagner | H04M 1/656 | 379/265.01 |
| 2007/0121811 A1* | 5/2007 | Ying | H04M 1/656 | 379/68 |
| 2007/0130177 A1* | 6/2007 | Schneider | G06F 17/30017 | |
| 2007/0156692 A1* | 7/2007 | Rosewarne | G06F 17/30861 | |
| 2007/0300216 A1* | 12/2007 | Miyagi | G06F 3/1208 | 717/168 |
| 2008/0037725 A1* | 2/2008 | Berstis | H04L 65/1073 | 379/88.13 |
| 2008/0063381 A1* | 3/2008 | Conroy | G11B 27/034 | 386/234 |
| 2008/0151767 A1* | 6/2008 | Moran | H04L 41/0253 | 370/252 |
| 2009/0198809 A1* | 8/2009 | Goto | G06F 9/45558 | 709/223 |
| 2010/0199185 A1* | 8/2010 | Greenberg | G06F 17/30899 | 715/733 |
| 2010/0271920 A1* | 10/2010 | Miyazaki | G11B 7/28 | 369/85 |
| 2010/0325557 A1* | 12/2010 | Sibillo | G06F 3/0481 | 715/751 |
| 2011/0113337 A1* | 5/2011 | Liu | G06F 3/0483 | 715/727 |
| 2011/0159921 A1* | 6/2011 | Davis | H04M 1/72569 | 455/556.1 |
| 2011/0225232 A1* | 9/2011 | Casalaina | G06F 17/30528 | 709/203 |
| 2011/0257974 A1* | 10/2011 | Kristjansson | G10L 21/0208 | 704/246 |
| 2012/0023404 A1* | 1/2012 | Liu | G06F 3/0483 | 715/716 |
| 2012/0081530 A1* | 4/2012 | Kerr | G11B 27/34 | 348/61 |
| 2012/0296957 A1* | 11/2012 | Stinson | G06F 19/327 | 709/203 |
| 2012/0308209 A1* | 12/2012 | Zaletel | G11B 27/034 | 386/278 |
| 2012/0315615 A1* | 12/2012 | Hilker | G09B 7/00 | 434/309 |
| 2012/0317638 A1* | 12/2012 | Carrara | G06F 21/44 | 726/17 |
| 2013/0104194 A1* | 4/2013 | Rago | H04L 63/08 | 726/3 |
| 2013/0150115 A1* | 6/2013 | Maggenti | H04M 1/656 | 455/518 |
| 2013/0173720 A1* | 7/2013 | Vasudev | H04L 12/5825 | 709/206 |
| 2013/0212478 A1* | 8/2013 | Karr | G06F 3/167 | 715/727 |
| 2013/0212521 A1* | 8/2013 | Fedoseyeva | G06Q 10/00 | 715/781 |
| 2013/0311899 A1* | 11/2013 | Guiro | G06Q 50/01 | 715/751 |
| 2014/0033076 A1* | 1/2014 | Al-Alami | G06F 3/0481 | 715/753 |
| 2014/0259179 A1* | 9/2014 | Leppanen | G06F 21/62 | 726/27 |
| 2014/0282908 A1* | 9/2014 | Ward | H04W 12/12 | 726/4 |
| 2015/0058709 A1* | 2/2015 | Zaletel | H04L 65/608 | 715/202 |
| 2015/0106736 A1* | 4/2015 | Torman | H04L 67/306 | 715/745 |
| 2016/0191534 A1* | 6/2016 | Mallozzi | G06F 21/6218 | 726/4 |
| 2017/0075919 A1* | 3/2017 | Bose | G06F 17/3012 | |

OTHER PUBLICATIONS

"File:Cr browser action icon changes.png", iMacros, retrieved on Jun. 17, 2014 from http://wiki.imacros.net/File%3ACr_browser_action_icon_changes.png, Dec. 4, 2009, 1 page.

(56) References Cited

OTHER PUBLICATIONS

International Search Report and Written Opinion for International Application No. PCT/US2014/022594, dated Jun. 25, 2014, 13 pages.
Protalinski, "Google Chrome may soon get audio indicators to show you noisy tabs, keep them open when memory runs out", The Next Web, Available online at <URL: https://thenextweb.com/google/2013/02/25/google-chrome-may-soon-get-audioindicators-to-show-you-noisy-tabs-keep-them-open-when-memory-runs-out/>, Feb. 26, 2013, 4 Pages.

* cited by examiner

FIG. 2 200  Prior Art
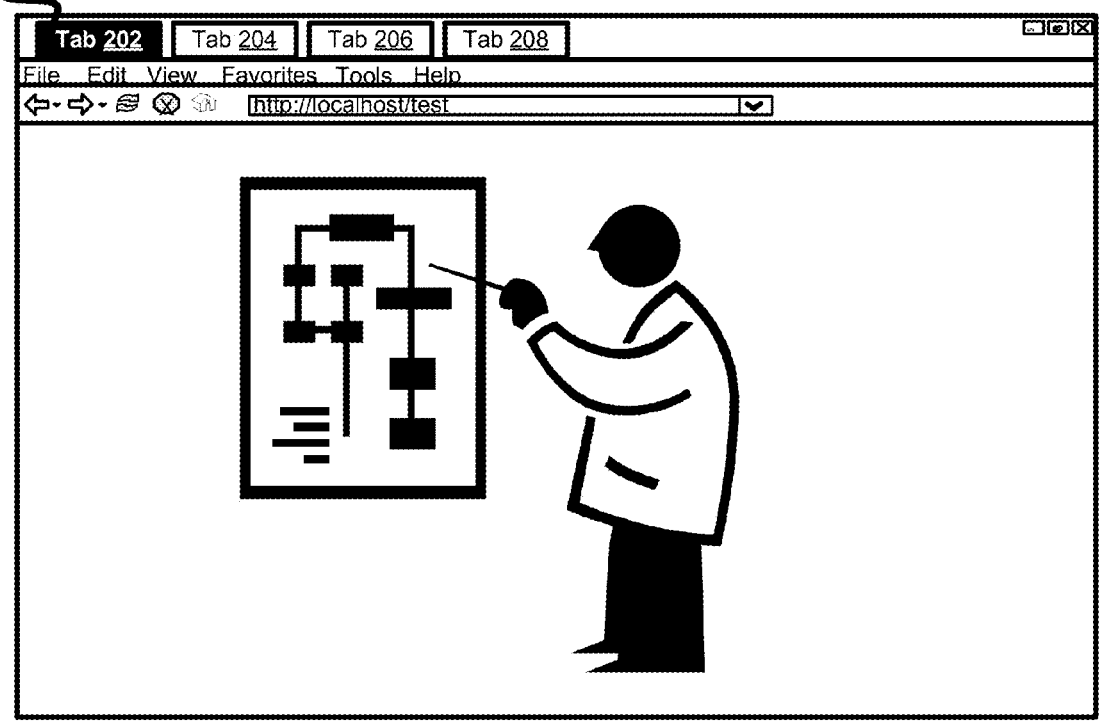
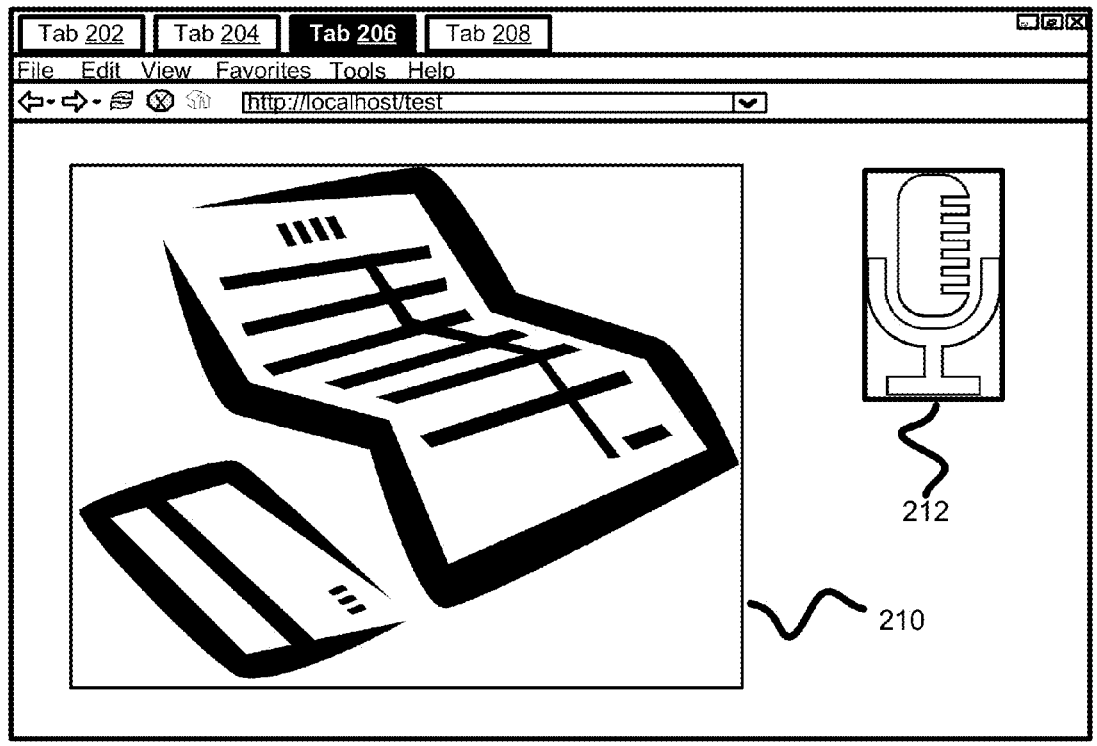

FIG. 7 700

702 Executing an application that includes a plurality of tabs, each tab associated with a respective document that is configured to be rendered for display by the application

704 Determining a particular tab of the plurality of tabs that is recording an audio and/or visual signal derived from an environment of the computing device

706 Providing a graphical indication, associated with the particular tab, that indicates to a user of the computing device that the particular tab is recording the audio and/or visual signal

708 Manipulating the audio signal, based upon a command generated by the graphical user interface in response to a user interaction

MANAGING AUDIO AT THE TAB LEVEL FOR USER NOTIFICATION AND CONTROL

TECHNICAL FIELD

This description relates to multimedia, and more specifically to controlling an audio and/or visual signal within an application.

BACKGROUND

In many applications several documents can be displayed at once in a graphical user interface (GUI). In the area of GUIs, a tabbed document interface (TDI) or multiple document interface (MDI) allows multiple documents to be contained within a single window. Often tabs can be used as containers to provide different content (e.g., documents, webpages, etc.) to a user within a single window of an application, and to allow the user to easily switch between viewing and interacting with the different content in the different tabs. TDI's and MDI's are interface styles most commonly included with web browsers, web applications, text editors and preference panes.

Generally, laptops that include a camera provide some indication when that camera is being used. For example, frequently a light or light-emitting diode (LED) is coupled or placed next to the camera. This light is often turned on when the camera is turned on to indicate to a user that the camera is recording or taking pictures. However, there is generally no similar indication when a computer's microphone is recording. Further, not all cameras include a similar indication feature.

Many modern web pages allow a user to make use of a connected camera or microphone to record audio/visual information. In modern web browsers, a web page is often displayed and controlled within a tab. Users generally interact with a web browser using one web page at a time, but often leave several tabs open simultaneously in order to quickly switch between pages. When a user interacts with only one tab at a time, while other tabs execute in the background, a user may forget or not be aware that the contents of a background tab is making use of an input device (e.g., camera, microphone, etc.).

SUMMARY

According to one general aspect, a method may include executing, by a processor of a computing device, at least a portion of an application that includes a plurality of tabs, each tab associated with a respective document that is configured to be rendered for display by the application. The method may also include determining a particular tab of the plurality of tabs that is recording an audio and/or visual signal derived from an environment of the computing device. The method may further include providing a graphical indication, associated with the particular tab, that indicates to a user of the computing device that the particular tab is recording the audio and/or visual signal.

According to another general aspect, a computing device may include a processor configured to execute an application that includes a plurality of tabs, each tab associated with a respective document that is configured to be rendered for display by the application. The computing device may also include an audio/visual controller configured to determine a particular tab of the plurality of tabs that is recording an audio and/or visual signal derived from an environment of the apparatus. The computing device may further include an audio/visual user interface (UI) generator configured to provide a graphical indication, associated with the particular tab, that indicates to a user of the apparatus that the particular tab is recording the audio and/or visual signal.

According to another general aspect, a tangibly embodied computer-readable medium include executable code of a machine-executable program. This executable code may be configured to, when executed, cause an apparatus to execute, by a processor of the apparatus, an application that includes a plurality of tabs, each tab associated with a respective document that is configured to be rendered for display by the application. The code may cause the apparatus to determine a particular tab of the plurality of tabs that is recording an audio and/or visual signal derived from an environment of the apparatus. The code may cause the apparatus to provide a graphical indication, associated with the particular tab, that indicates to a user of the apparatus that the particular tab is recording the audio and/or visual signal.

The details of one or more implementations are set forth in the accompanying drawings and the description below. Other features will be apparent from the description and drawings, and from the claims.

A system and/or method for controlling an audio and/or visual signal, substantially as shown in and/or described in connection with at least one of the figures, as set forth more completely in the claims.

BRIEF DESCRIPTION OF THE DRAWINGS

FIG. 2 is a diagram of an example embodiment of an application in accordance with the disclosed subject matter.

FIG. 7 is a flowchart of an example embodiment of a technique in accordance with the disclosed subject matter.

Like reference symbols in the various drawings indicate like elements.

DETAILED DESCRIPTION

Techniques are described herein in which one or more audio and/or visual signals that are to be input from a local microphone or camera are detected and in which one or more applications running on a computer system are determined to be included or associated with the audio/visual signal(s). In addition, the application(s) that is/are determined to be included with the audio/visual signal(s) can include a plurality of tabs, and the individual tab or tabs that is or are included with the audio-visual signal(s) can be determined. Within a graphical user interface in which the tabs included with the audio/visual signal(s) are displayed to a user, the audio/visual signal(s) can be controlled through user commands issued to the application(s) included with the audio/visual signals through the user interface in which the tabs are displayed. The method may include manipulating the audio/visual signal, based upon a command generated by the graphical user interface in response to a user interaction.

Figure 1:
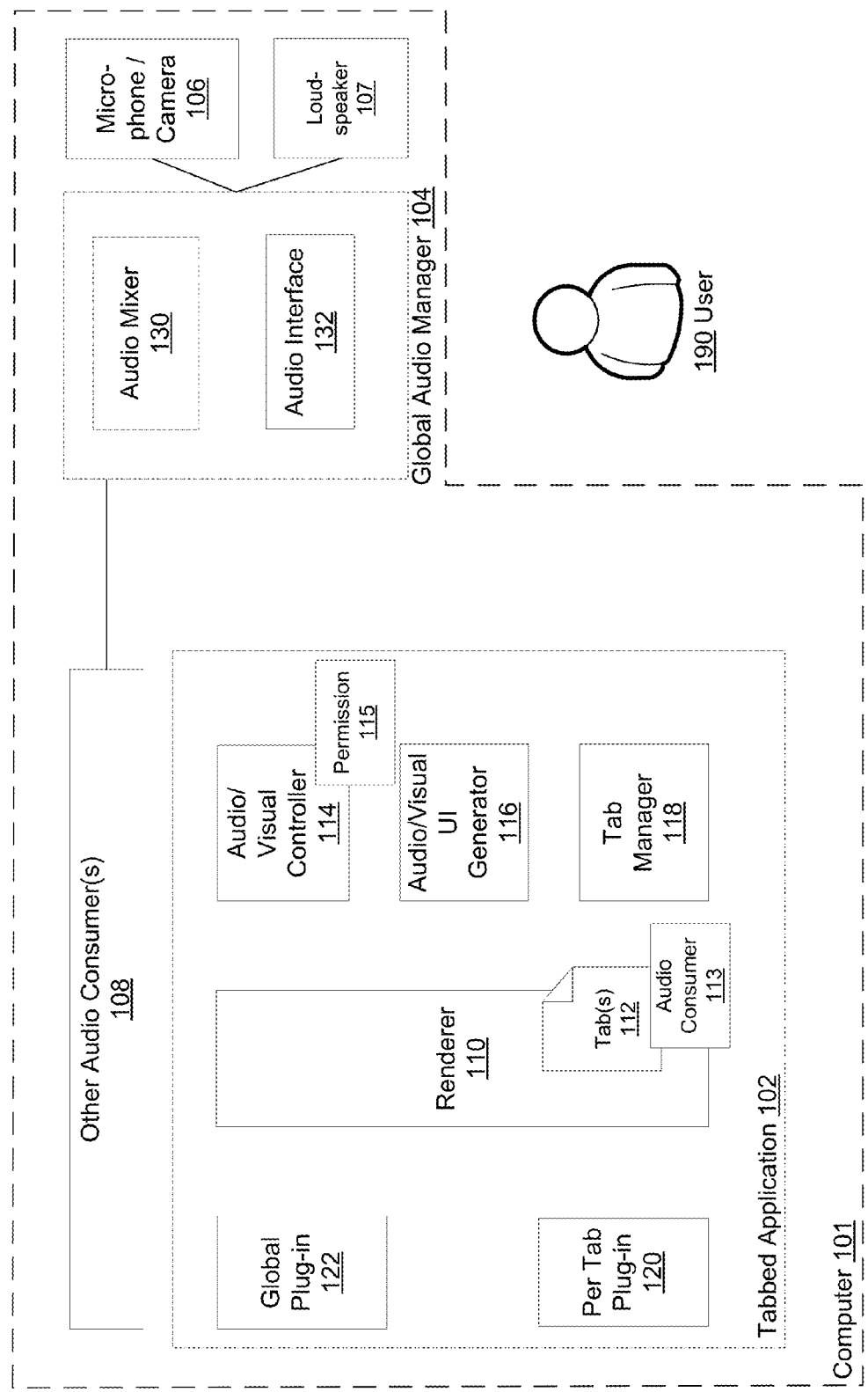
FIG. 1 is a block diagram of an example embodiment of a system in accordance with the disclosed subject matter.

FIG. 1 is a block diagram of an example embodiment of a system 100 in accordance with the disclosed subject matter. In one embodiment, the system 100 may include a computer 101, which in turn may include a tabbed application 102, a global audio manager 104, and a microphone and/or camera 106. In the illustrated embodiment, the tabbed application 102 may include a web browser, which may open multiple tabs of content in a window of the browser. However, it is understood that other tabbed or MDI applications may be included in various embodiments (e.g., text editors, presentation applications, media players, etc.). It is understood that the above are merely a few illustrative examples to which the disclosed subject matter is not limited.

In another embodiment, the system 100 may include a camera 106. In various embodiments, the camera may include the ability to record light in a variety of wavelengths (e.g., within the visual spectrum, infrared, ultraviolet, etc.). In some embodiments, the system 100 may include both a microphone and a camera or multiple versions of such input devices (e.g., both an infrared and visual spectrum cameras, etc.). In various embodiments, the system 100 may more generally said to include a sensor 106 configured to record a form of input from or derived from an environment of the computer 101 or system 100 or within a detection area. It is understood that the above are merely a few illustrative examples to which the disclosed subject matter is not limited.

While, in this context, the term "microphone" and "audio signal" will be predominantly used, it is understood that such is merely one illustrative example to which the disclosed subject matter is not limited, and that other embodiments that include non-audio components (e.g., visual components) may include subsystems and components similar or analogous to the audio components described herein (e.g., a video controller, etc.).

In various embodiments, the tabbed application 102 may include a renderer 110 configured to render or cause to be displayed a document within the application 102 or a window GUI element thereof. In the illustrated embodiment, the renderer 110 may display multiple documents in a number of tabs 112. In one embodiment, the renderer 110 may be configured to work in conjunction with a tab manager 118. In such an embodiment, the tab manager 118 may be configured to manage the tabs 112 and their creation, deletion, ordering, etc. with the application 102.

In various embodiments, a document or other content rendered within a tab 112 may include an element (e.g., Hypertext Markup Language (HTML) Input tag, embedded plug-on object, etc.) configured to receive or record an audio and/or visual signal, illustrated by audio consumer 113. In such an embodiment, the audio signal may be controlled by the application's 102 audio controller 114. The audio controller 114 may be configured to receive the audio signal from the global audio manager 104. In one specific example, the tabbed application 102 may include a web browser that may open a plurality of tabs of audio/video content, and the audio/video content of each respective tab may consume or cause to be recorded audio signals produced by the microphone 106.

In various embodiments, the global audio manager 104 may be configured to provide an interface between a plurality of applications (e.g., application 102, etc.) and the microphone 106. In some embodiments, the global audio manager 104 may include driver software, firmware, or a combination thereof. In one embodiment, the global audio manager 104 may include an audio mixer 130 and an audio interface 132.

In one embodiment, the audio interface 132 may be configured to collect an audio signal or digital samples of an analog audio signal collected or gathered from a microphone 106. This audio signal may then be passed or made available to one of more audio consumers 108. In the illustrated embodiment, one of the audio consumers may include the tabbed application 102.

In such an embodiment, the microphone 106 may be configured to generate an audio signal (e.g., from a sound detectable by human hearing, etc.). The microphone 106 may include an electrical transducer configured to convert sound or sound waves to an electrical signal. In various embodiments, as described above, the system 100 may include other sensors (e.g., video camera, etc.) configured to generate similar respective electrical signals.

In one embodiment, the audio mixer 130 may be configured to receive audio signals from one or more sources, such as the microphone 106 (via the audio interface 132), application 102, its tabs 112, plug-ins 120 or 122, or other audio sources 108 included by or executing on the computer 101, etc. In various embodiments, the other audio sources may include other applications, pass-through audio signals (e.g., a microphone, etc.), loopbacked signals (e.g., signals generated by one application and then re-routed to a microphone or audio-in port, etc.), or other audio sources. The audio mixer 130 may be configured to provide a level of gain or volume control to each of these audio signals and combine them into a single audio signal for consumption by the loudspeaker 107.

It is understood that while herein the term "an audio signal" is used in the singular sense, the term includes multiple channel audio signals (e.g., stereo, surround sound, 8-track, etc.). In such an embodiment, the audio mixer 130 may apply various levels of gain or volume control (including muting, etc.) to the various channels of the audio signals, and that the microphone 106 may include multiple microphones (e.g., right channel microphone, left channel microphone, etc.).

In various embodiments, one or more tabs 112 open in the tabbed application 102 may cause an audio signal to be recorded. For example, as explained above, in a specific example, the tabbed application 102 may include a web browser that may open a plurality of tabs, one or more of which may cause audio and/or video content to be recorded from the environment of the computer 101 (e.g., a video conference, a picture, a chat session, etc.). The audio and/or video content recorded for each respective tab may cause audio signals to be recoded, gathered, or generated via the microphone 106. In various embodiments, the techniques disclosed herein may be configured to provide a user 190 with a fine granularity of control of the content in the various tabs, which are responsible for the audio signal(s).

In various embodiments, the audio controller 114 may be configured to determine which tab or tabs 112 of the tabbed application 102 contain the content that causes the audio signal(s) to be generated or which respective audio signal is being generated for which tab 112. In various embodiments, this task may be performed by the global audio manager 104, in which case, the global audio manager may first determine which application (e.g., tabbed application 102 or other audio consumers 108, etc.) caused the audio signal to be generated or consumer or receive the audio signal.

The determination of the tab(s) included with the audio signal(s) may be performed in various ways. For example, in the case of a tab 112 that includes an audio element (e.g., the HTML Input tag or Capture field, etc.) the renderer 110 may identify the tab 112 as being a consumer of the audio signal. In another embodiment, the audio signal may be indirectly associated by the tab 112. In various embodiments, the audio signal may be consumed by a plug-in (e.g., plug-ins 120 and 122).

In this context, a "plug-in" is generally a component that adds specific capabilities (e.g., the ability to play a certain filetype, the ability to communicate in a secure fashion, etc.) to a larger application 102. In various embodiments, a plug-in may not be capable of being executed without the assistance of the larger application 102. Generally, there are two types of plug-ins, a per tab plug-in 120 and a global plug-in 122, although it is understood that the above are merely a few illustrative examples to which the disclosed subject matter is not limited.

A per tab plug-in 120 may include a plug-in configured to be instantiated a single time per tab 112 or per element on the tab 112. For example, if the renderer 110 detects that the tab 112 includes an element included with the per tab plug-in 120, the renderer 110 may invoke or cause a version of the per tab plug-in 120 to be instantiated or executed to handle or process the associated element. If multiple tabs 112 include elements included with the plug-in 120, multiple instantiations of the plug-in 120 may occur. In such an embodiment, the audio controller 114 may easily determine if a per tab plug-in is the source or included with an audio signal.

In various embodiments, the elements included by or included with a tab 112 may include HTML tags, Extensible Markup Language (XML) elements, GUI elements (e.g., buttons, fields, panes, etc.), embedded objects (e.g., Object Linking and Embedding (OLE) objects, Component Object Model (COM) objects, etc.), etc., although it is understood that the above are merely a few illustrative examples to which the disclosed subject matter is not limited.

In the case of a global plug-in 122, the global plug-in 122 may be instantiated or executed once per computer 101 or application 102. In such an embodiment, a single version of the global plug-in 122 may process or handle a number of elements or tabs 112 comprising elements included with the global plug-in 122. In various embodiments, the global plug-in 122 may handle or process elements regardless of which application (e.g., application 102 or other audio consumers 108) consumes or is included with the element. In such an embodiment, it may be very difficult for the audio controller 114 to determine on its own which tab 112 or application 102 or 108 is associated with an audio signal.

In one embodiment, the audio controller 114 may query the global plug-in 122 to determine which application (e.g., application 102 or 108) is included or associated with an audio signal. In another embodiment, the audio mixer 130 or global audio manager 104 may query the global plug-in 122 to determine the application or tab included with the audio signal. In such an embodiment, if the audio signal is included with an application 102 that supports fine grain audio control, the global audio manager 104 may inform the application's 102 audio controller 114 of the results and tab's 112 association with the audio signal.

In yet another embodiment, the global plug-in 122 may proactively inform either the global audio manager 104 or the application's 102 audio controller 114 that the global plug-in 122 is generating or included with an audio signal and which tab 112 and/or element is included with that audio signal. In various embodiments, the global plug-in 122 may inform the global audio manager 104 or the application's 102 audio controller 114 of a list of commands or other operations (e.g., record, pause, mute, stop, resume, etc.) which may be performed upon the audio signal.

A number of possible message formats and messaging fields may be used or employed to communicate between the global plug-in 122 and the global audio manager 104 or audio controller 114. In various embodiments, a message may include an audio signal identifier to indicate which of a plurality of audio signals is the subject of the message. In another embodiment, the message may include a plug-in identifier configured to indicate that plug-in associated with the recorded audio signal. In yet another embodiment, the message may include a tab identifier configured to indicate that tab associated with the recorded audio signal. It is understood that the above are merely a few illustrative examples to which the disclosed subject matter is not limited.

Once the tab(s) 112 included with an audio signal has been determined (e.g., by the audio controller 114 or the global audio manager 104), the audio controller 114 may determine if the tab 112 is allowed or permitted to record the audio signal. In one embodiment, the audio controller 114 may cause the audio user interface (UI) generator 116 to generate or display a UI element (e.g., a modal dialog box, a notification message, etc.) asking the user 190 if they wish to allow the recording to take place. If the user 190 grants permission to record the audio signal, the audio controller 114 may allow the recording and the audio UI generator 116 may provide the UI indication, as described below. If the user 190 does not give their permission, the audio controller 114 may block or prevent the recording of the audio signal. In some embodiments, this may include turning the microphone 106 off. In another embodiment, this may include instructing the audio mixer 130 or other portion of the global audio manager 104 to mute or not provide to the tab 112 or the tabbed application (in some embodiments) the audio signal produced by the microphone 106. It is understood that the above are merely a few illustrative examples to which the disclosed subject matter is not limited.

In some embodiments, the audio controller 114 may be configured to store or access a list of permissions 115. In various embodiments, these permissions may include permissions previously granted/denied by the user 190, one or more default permissions (e.g., based upon a communications protocol, such as, for example, Hypertext Transfer Protocol (HTTP), based on an address or uniform resource locator (URL) of a web page associated with the tab 112, based on a third party report of the trustworthiness of the web page associated with the tab 112, etc.), one or more rules, etc. In some embodiments, these permissions 115 may be stored temporarily (e.g., for a single execution of the tabbed application 102, the time the tab 112 is open or exists, etc.), permanently, or a combination thereof. In various embodiments, each recording device 106 (e.g., built-in microphone, built-in camera, Bluetooth headset, etc.) may be associated with a permission. In such an embodiment, the user 190 may have allowed or granted recording via the built-in microphone and camera, but not a Bluetooth microphone. In another embodiment, the permission may be valid across all devices capable of or configured to record a certain type of sensory input (e.g., all microphones, all cameras, etc.) It is understood that the above are merely a few illustrative examples to which the disclosed subject matter is not limited.

In a preferred embodiment, if the web page associated with the tab 112 does not make use of a secure or encrypted communications protocol (e.g., HTTP as opposed to HTTP Secure (HTTPS), etc.) a permission granted may not be stored beyond the existence of the tab 112 within the tabbed application 102. In such an embodiment, if the user 190 grants permission for a tab 112 to record an audio signal, then closes the tab 112, and then opens the web page that was previously associated with the tab 112, the audio controller 114 will ask the user 190 a second time for permission to the record the audio signal.

Conversely, in a preferred embodiment, if the tab 112 does make use of a secure or encrypted communications protocol, the user 190's granting or denying of the ability to record the audio signal may be stored within the permissions 115 and may be used the next time the user 190 accesses the web page associated with the tab 112. In such an embodiment, if the user 190 grants or denies permission for a tab 112 to record an audio signal, then closes the tab 112, and then opens the web page that was previously associated with the tab 112, the audio controller 114 will not ask the user 190 a second time for permission to the record the audio signal. It is understood that the above is merely one illustrative example to which the disclosed subject matter is not limited.

In various embodiments, the audio controller 114 and/or the audio UI generator 116 may be configured to provide a UI interface via which a user 190 may modify their permission selection. In such an embodiment, the user 190 may revoke or authorize a web page to record the audio signal (or other signal, e.g., video, etc.). In some embodiments, such a UI interface may allow the user 190 to establish one or more rules based upon a variety of criteria, such as those discussed above.

In various embodiments, the computer 101 or even the tabbed application 102 may be used by a plurality of users 190. In such an embodiment, the permissions 115 may each be associated with individual users or users identifiers (e.g., usernames, email addresses, etc.). In such an embodiment, a first user 190 may grant permission for a tab to record the audio signal and a second may deny permission to record the audio signal. The audio controller 114 may allow or deny permission based upon the user associated with eh particular tab 112 at the given time of recording. In various embodiments, another set of permissions 115 may be associated with the event in which no particular user is logged in or discernible. In some embodiments, the set of permissions 115 may be transmitted to or received from a central storage device (not shown). In such an embodiment, the permissions 115 for each user 190 may be synchronized between a plurality of computing devices 101. It is understood that the above are merely a few illustrative examples to which the disclosed subject matter is not limited.

In some embodiments, once the tab(s) 112 included with an audio signal has been granted permission to record the audio signal, the audio user interface (UI) generator 116 may create a graphical UI (GUI) from which the user 190 may manipulate the audio signal or the audio signal's processing by the computer 101. The audio UI generator 116 may be configured to provide the GUI in the context of a handle of the tab 112, where a "tab" can be the container of all the content of the webpage and a "handle of a tab" can be a UI element that is included with the tab but displays none of the content, or less than the full content, of the tab.

A "handle of a tab" or a "tab handle" may include a GUI element configured to facilitate the selection of a tab (e.g., to bring the tab into "focus," as described in more detail in the context of FIG. 2), or to move the position of a tab's content within a GUI displayed to a user. For example, a tab handle may be selected through the action of a mouse and dragged to move the content included with the tab to a new location on a display screen.

Additionally, by creating the graphical UI (GUI) from which the user 190 may manipulate the audio signal or the audio signal's processing and by providing a tab handle to include the UI, the tab handle may facilitate the control of the gathering or recording audio/visual content within the tab. Thus, a tag handle may include GUI elements that provide information about the audio content or status of a tab (e.g., that indicate whether content of the tab is currently responsible for recording an audio signal via the microphone 106) and may provide selectable control elements with which a user may control audio content within the tab (e.g., that may allow a user to mute/unmute or control the volume of the recorded audio signal of the tab, stop recording from the microphone 106, etc.). Thus, tag handles provide a quick way through which a user can understand which one(s) of many tabs that may be open is/are responsible for recording audio/video signals, without the user having to review the content of each open tab to understand this or may simply make the user 190 aware that the tabbed application 102 is still recording an audio/video signal. Furthermore, the tag handles allow the user to adjust (e.g., mute, unmute, pause, etc.) an audio signal recorded by content of a tab when many tags are open, without the user having to review the content of each open tab to make such adjustments.

While many types of tab handles may exist and are contemplated within the scope of the disclosed subject matter, three types are described in detail below, each in turn and in reference to their specific figures. A "label handle" 201 (seen in FIGS. 2 & 3) is often a small rectangular GUI element protruding from the main rectangular element of the tab itself, and generally shows the label or title (e.g., filename, HTML page title, etc.) of the tab it is included with. A label handle is analogous to and often modeled after traditional card tabs inserted in paper files or card indexes. A "thumbnail handle" 406 (seen in FIG. 4) often includes a miniature picture or representation of the contents or a subset of the contents of a tab. In various embodiments, the thumbnail handle may be active or dynamic, in that the miniature picture may change as the contents of the tab change (e.g., as a video is played or recorded, etc.). Although, it is understood that the above are merely a few illustrative examples to which the disclosed subject matter is not limited.

As described above, the audio UI generator 116 may be configured to provide the GUI in a way that is included with a handle of the tab 112 that include the audio consumer 113. In various embodiments, the audio UI generator 116 may be configured to provide a GUI included with the tab handle that facilitates or allows a user 190 to manipulate the audio signal. In such an embodiment, the tab handle GUI may generate commands, at a user's 190 request or user interaction (e.g., by selecting a button, shaking the device, etc.), that instruct the application 102 or global audio manager 104 to manipulate the audio signal. For example, a user 190 may command that the recorded audio be muted, increased in volume, decreased in volume, paused, that the application 102 or other audio controlling component (e.g., plug-in 120) stop or end the recording of the audio signal, etc., although it is understood that the above are merely a few illustrative examples to which the disclosed subject matter is not limited.

In various embodiments, the audio controller 114 may be configured to process or act upon the received audio command and manipulate the audio signal that is generated based on the contents of a tab. In some embodiments, if the command is one that may be performed by the audio mixer 130 (e.g., muting, input volume control, etc.) the command may be passed, in whole or in, part or essence, to the audio mixer 130; although the audio controller 114 may process the command internally to the application 102. In another embodiment, the command may be included with a plug-in (e.g., plug-ins 120 and 122). In which case, the audio controller 114 may pass the command, in whole, part or essence, to the respective plug-in for processing. Likewise, in embodiments in which the global audio manager 104 is the controlling component, commands may be passed to the respective application's 102 audio controller 114, plug-ins 120 & 112, or handled internally by the audio mixer 130.

FIG. 2 is a diagram of an example embodiment of an application 200 in accordance with the disclosed subject matter. In the illustrated embodiment, the application 200 may include a web browser, although it is understood that the above is merely one illustrative example to which the disclosed subject matter is not limited. In various embodiments, the application 200 may include a plurality of tabs, such as tabs 202, 204, 206, and 208, where the tabs are used as containers to provide different content to a user within the a single window of the application 200.

In one embodiment, shown in the top portion of FIG. 2, the tab 202 may be in the foreground or have focus, as illustrated by the tab's 202 label handle 201 being highlighted, such that content contained in tab 202 is displayed to a user. In the computing context, a UI element is considered to "have focus" if the operating system or computer has selected or identified that UI element as the proper element to receive user input. The content of other tabs 204, 206, 208 are not in focus and therefore the content of tabs 204, 206, 208 is not displayed, and only the label handles of tabs 204, 206, and 208 are displayed.

In the bottom portion of FIG. 2 tab 206 is in focus, while tabs 202, 204, 208 are not in focus, and therefore the content of tabs 202, 204, and 208 is not displayed. Tab 206 may contain a number of content elements or portions of a document that include various elements. A first content element 210 may not include any audio recording or gathering elements, for example, documents, fill-able forms, pictures, etc., whereas a second element 212 may include an audio recording or gathering content element, for example, an HTML Input tag, an Adobe™ Flash™ application, etc.

In various embodiments, this audio element 212 may rudely begin to record the audio (gathering the audio signal) automatically once the audio element 212 is loaded by the tab 206. In some embodiments, this may occur even if the tab 206 is in the background or does not have focus (e.g., if tab 202 has focus, etc.). This may be inconvenient or embarrassing for a user. Further, if the user was not aware that the tab 206 includes an audio element (e.g., a video chat, a teleconference, etc.), the user may not be sure which tab 204, 206, or 208 or even which application (if multiple applications are being executed) is associated with or included with the audio signal that is being recorded. Therefore, the user may find it difficult to quickly turn off, mute, or manipulate the recording of the audio signal.

In another embodiment, the user may initially be aware the audio element 212 is recording an audio signal (e.g., the user initialed a video conference, etc.), but the user may have then switched to another tab (e.g., tab 202). In such an embodiment, the user may have forgotten that the audio element 212 is still recording the audio signal. In some embodiments, this may occur even if the tab 206 is in the background or does not have focus (e.g., if tab 202 has focus, etc.). Again, this may be inconvenient or embarrassing for a user. Therefore, the user may find it useful or helpful for an UI element (e.g., that described in FIGS. 3 and 4) to indicate that the tab element 212 is still recording of the audio signal.

Figure 3:
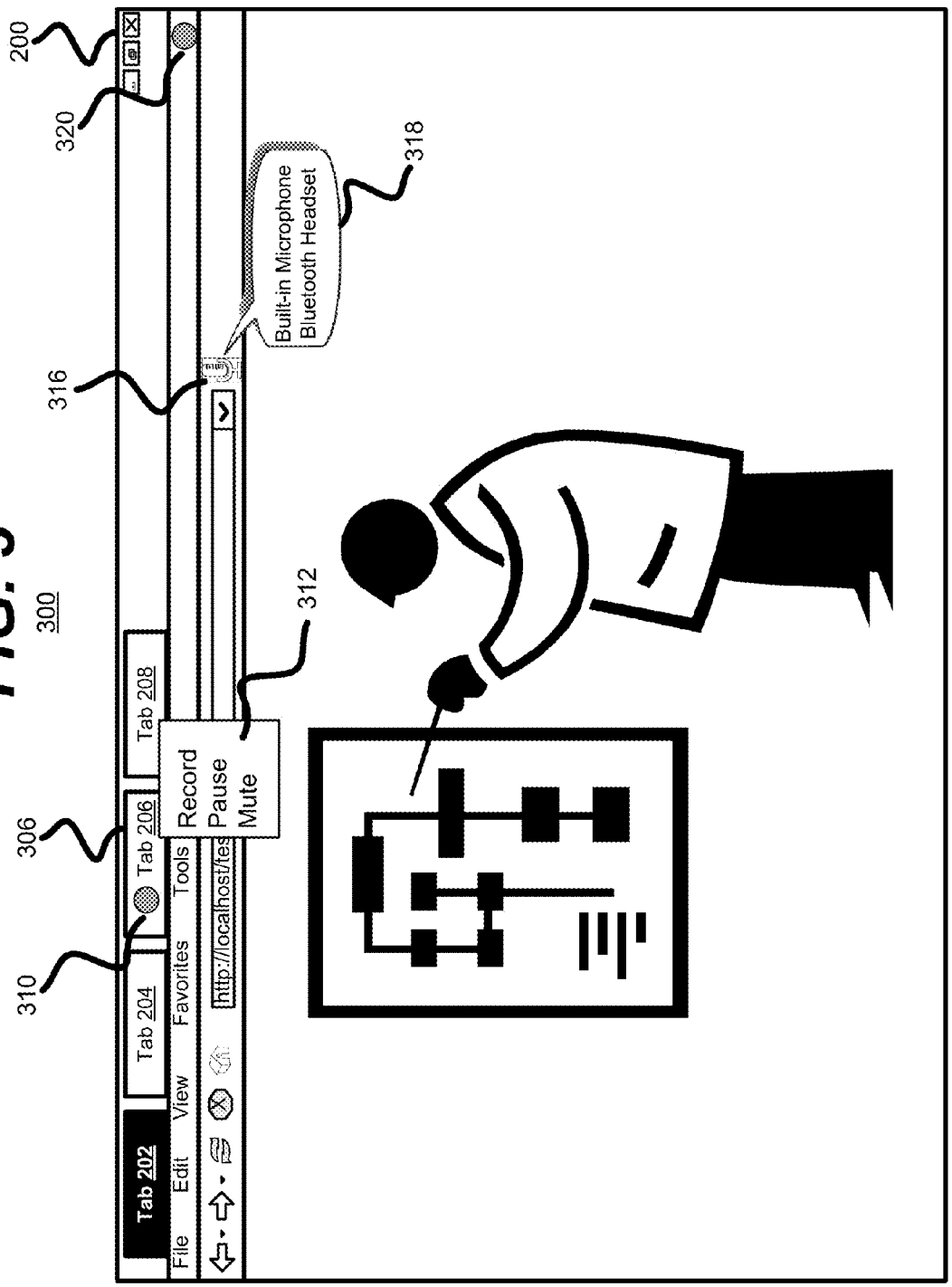
FIG. 3 is a diagram of an example embodiment of a graphical user interface in accordance with the disclosed subject matter.

FIG. 3 is a diagram of an example embodiment of a graphical user interface 300 in accordance with the disclosed subject matter. In the illustrated embodiment, the application 200 of FIG. 2 is shown with a GUI included with the label handle 306 of the tab 206, although it is understood that the illustrated is merely one illustrative example to which the disclosed subject matter is not limited.

In one embodiment, once it has been determined that the application 200 and that tab 206 are recording or are included with the audio signal (generated by element 212 of FIG. 2), a GUI for controlling or manipulating the audio signal may be included with the label handle 306 of tab 206. In the illustrated embodiment, the GUI may be included with tab handle 306 even if the tab 206 is not in the foreground or given focus. In the illustrated embodiment, the tab 202 is highlighted to show that its content is currently in the foreground and given focus and that tab 206 is in the background and is not given focus. In such an embodiment, the user may manipulate the audio signal recorded by content of tab 206 without opening tab 306 and without causing the contents of tab 206 to be displayed or brought to the foreground.

In one embodiment, the GUI included with label handle 306 may include a badge or icon 310 (e.g., a pulsating or blinking red circle, etc.) configured to indicate that the tab 206 is associated or included with a recorded audio signal. In various embodiments, if a plurality of tabs (e.g., tabs 206 and 208) are both recording audio signals, each tab may be included with its own audio manipulation GUI and icon 310. In one embodiment, if the user selects or clicks on the icon or badge 310, the audio signal may be muted or unmated, in a toggling fashion. In such an embodiment, the icon 210 may be changed (e.g., to static red circle with a red "X" over it, to two red parallel bars, etc.) to indicate the status of the audio signal. In another embodiment, a user may hover the mouse or cursor (not shown) over the icon 310 and use a scroll wheel or dynamically displayed slide-bar to control the recording volume level. Once again, the icon 310 may dynamically change (e.g., gaining or shedding audio wave bars, changing the diameter of the circle, etc.) to reflect any manipulation of the recorded audio signal. It is understood that the above are merely a few illustrative examples to which the disclosed subject matter is not limited.

In another embodiment, the GUI included with the label handle 306 may include a menu 312. In various embodiments, if a user right-clicks or otherwise selects the label handle 306 in a predetermined fashion, a menu 312 may be displayed. In some embodiments, the menu 312 may include a variety of audio manipulation commands (e.g., record, pause, etc.) that may be issued by the user to the application. In such an embodiment, the selection of the GUI included with the label handle 306 to display menu 312 may not cause the tab 206 to have focus and may not cause the content of tab 206 to be brought to the foreground. Thus, the content of tab 202 may continue to be displayed to the user while menu 312 is also displayed. The menu may or may appear in association in association with the tab 206.

In various embodiments, the audio manipulation commands may vary by the type of audio consumer (e.g., HTML Input tag, HTML Container property, a Flash™ object, etc.). In such an embodiment, a plug-in may instruct the audio UI generator which commands are supported for an audio consumer. For example, a plug-in may only support recording the audio signal at a default volume level (e.g., gain, if any, may be applied after recording the audio signal, etc.). In another example, a plug-in or the file played by the plug-in may support switching between microphones or devices that are configured to record or produce the audio signal etc. In another embodiment, the commands related to volume control (e.g., muting, quieter, louder, etc.) may be universally supported and controlled by the audio controller or audio mixer, regardless of the plug-in support, while other commands are supported based upon the plug-in, as described above. It is understood that the above are merely a few illustrative examples to which the disclosed subject matter is not limited.

In a preferred embodiment, the GUI may also include a badge or icon 316 displayed within or alongside an address bar or omnibox. In various embodiments, the address bar or omnibox may be configured to display the URL or address of a web page associated with the respective tab. In the illustrated embodiment, the icon 316 may indicate whether or not the user has previously granted or denied permission for the associated web page to record an audio (or other) signal. In one such an embodiment, if the user has previously made no indication and the web page is not requesting to record an audio signal, the icon 316 may not be displayed. In such an embodiment, the icon 316 may include not only the permission state (granted, denied, etc.) but the type of device or sensory input the permission concerns. For example, a microphone may be displayed if the user granted permission to record audio, and a camera may be displayed if the user granted permission to record video, or a greyed-out or crossed-out microphone may be displayed if permission was denied. In yet another embodiment, the icon 316 may include a similar icon to the icon 310 or vice versa. It is understood that the above are merely a few illustrative examples to which the disclosed subject matter is not limited.

In various embodiments, the GUI included with the icon 316 may include a menu or UI interface 318. In some embodiments, the UI interface 318 may be identical to menu 312. In another embodiment, the UI interface 318 may allow a user to select from which recording device (e.g., built-in microphone, Bluetooth headset, etc.) the audio or respective signal is to be provided. In a preferred embodiment, the UI element 318 may be displayed as or artistically represented as a speech balloon or bubble. It is understood that the above is merely one illustrative example to which the disclosed subject matter is not limited.

In various embodiments, a web browser or application may execute a tab that is hidden or non-visible, such that it is not associated with a label handle. In various embodiments, this may occur due to a web extension or other plug-in. In such an embodiment, a UI element or icon 320 may be displayed in a central or common area of the application UI 300 to indicate that a recording is occurring. In the illustrated embodiment, the icon 320 may be similar to the icon 310 and its associated UI elements (e.g., menu 312). In another embodiment, the icon 320 may be similar to the icon 316 and its associated UI elements (e.g., speech balloon 318). In yet another embodiment, the icon 320 may combine features of the two UI elements or icons 310 and 316. In a preferred embodiment, the indication or UI element notifying a user that an hidden tab is recording a signal may be displayed in a central location depending upon the operating system (e.g., a notification center, etc.), as described below. It is understood that the above are merely a few illustrative examples to which the disclosed subject matter is not limited.

Figure 4:
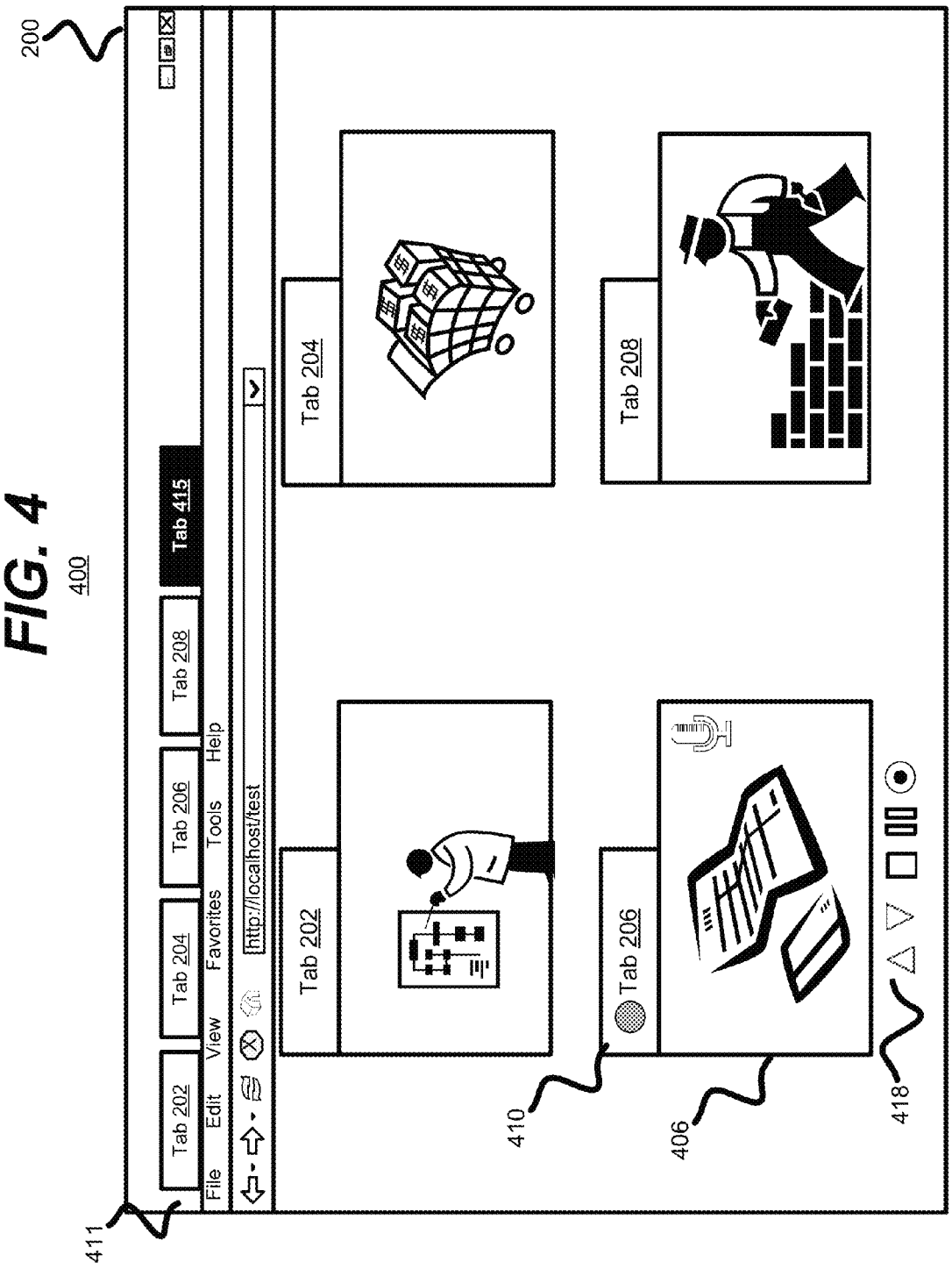
FIG. 4 is a diagram of an example embodiment of a graphical user interface in accordance with the disclosed subject matter.

FIG. 4 is a diagram of an example embodiment of a graphical user interface 400 in accordance with the disclosed subject matter. Again, application 200 is shown, however, it is understood that such a UI 400 may be included a part of an operating system or windows manager (e.g., a window switcher, etc.). In various embodiments, the UI 400 may be included as part of a home screen or initial tab interface of application 200. For example, in one embodiment, when application 200 is launched, and before any tabs are opened and positioned in the tab bar 411, a generic tab handle 415 can be displayed in the tab bar, and thumbnails of tabs that were previously displayed can be shown. In another embodiment, the UI 400 may be displayed (e.g., upon user request) while one or more tabs are open in a browser, and thumbnails of the currently open tabs can be shown. It is understood that the above are merely a few illustrative examples to which the disclosed subject matter is not limited.

Thus, in one embodiment, the UI 400 may display thumbnail tab handles of the tabs 202, 204, 206 and 208, which display a representation of, or less than the full content of, tabs 202, 204, 206 and 208. These thumbnail tab handles may allow a user to select or manipulate (e.g., close, select, move, rearrange, etc.) the various tabs of the application 200 or, in another embodiment, other applications or windows.

As shown in FIG. 4, tab 206 is included with the audio signal, as described above. In various embodiments, the thumbnail tab handle 406 or the GUI included with the thumbnail handle 406 may include an icon or badge 410 configured to indicate which tab is included with the audio signal, as described above.

In various embodiments, the thumbnail tab handle 406 or the GUI included with the thumbnail handle 406 may include GUI elements 418 configured to facilitate the manipulation of the recorded audio/visual signal. For example the GUI elements 418 may include an icon to raise the volume of the recorded audio signal, lower the volume of the recorded audio signal, stop the recording of the audio signal, pause the recording of the audio signal, or start the recording of the audio signal, etc. It is understood that the above are merely a few illustrative examples to which the disclosed subject matter is not limited.

Figure 5:
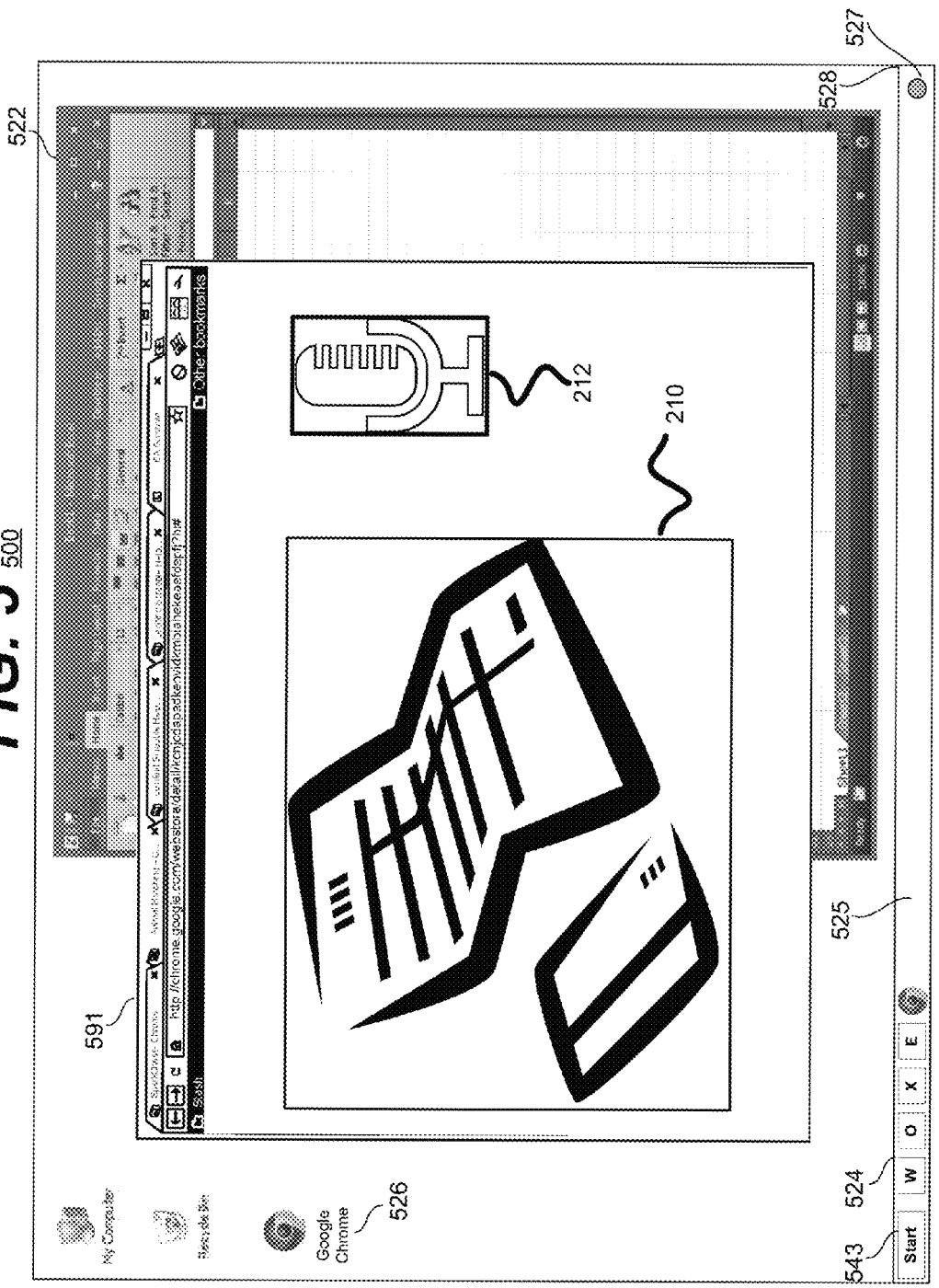
FIG. 5 is a diagram of an example embodiment of a graphical user interface in accordance with the disclosed subject matter.

FIG. 5 is a diagram of an example embodiment of a user interface 500 in accordance with the disclosed subject matter. In the illustrated embodiment, the tabbed application is displayed within the window 591 within the broader context of the native operating system (OS). In some embodiments, the UI 500 may include more or more other windows 522 associated with one or more other applications.

In various embodiments, the UI 500 may include a desktop or screen of the native OS. In some embodiments, the native OS may support multiple virtual screens or virtual desktops, of which UI 500 may be only one. In some embodiments, a virtual desktop may include a user interface in which the virtual space of a computer's desktop or screen environment is expanded beyond the physical limits of the screen's display area through the use of software. In various embodiments, of virtual desktops may be seen in Apple's OS X "Spaces" feature or UNIX's X Window system; although, it is understood that the above are merely a few illustrative examples to which the disclosed subject matter is not limited.

In the illustrated embodiment, the native OS may include a taskbar 525 at the bottom of the UI 500 that includes a menu 543 and a number of icons 524 representing various applications or programs that may be executed. In various embodiments, the web browser that creates window 591 may be included in the list of icons 524. The native OS desktop 500 may also include one or more icons 526 positioned outside the taskbar 525. In various embodiments, these icons may perform or facilitate the performance of one or more actions by the native OS (e.g., file system management, deletion of files, launch applications, etc.). It is understood that the above is merely one illustrative example to which the disclosed subject matter is not limited.

In one embodiment, the UI 500 may include a notification center 528 configured to provide an overview of alerts or notifications from various applications or the OS. In some embodiments, the notification center 528 may be included or associated with the taskbar 525. In another embodiment, the notification center 528 may be independent of the taskbar 525. In some embodiments, the notification center 528 may include a pull-down menu or UI element, a sidebar UI element, a dialog box or other UI element (e.g., a balloon tip or message, etc.), tray or area in which visual indicators or icons are displayed, etc.

In the illustrated embodiment, the notification center 528 may include or display the visual indicator 527 that indicates that an application or tab is recording an audio and/or visual signal. In some embodiments, the user may interact with the visual indicator 527 similarly to that described in relation to FIG. 3 or 4. In various embodiments, selecting the visual indicator 527 or selecting a UI element associated with the visual indicator 527 (e.g., a menu item, etc.) may cause the associated application or tab to be brought to the foreground or receive focus. In a preferred embodiment, the visual indicator 527 may be used or employed for hidden or non-visible tabs (e.g., one created by a web extension, etc.). While the notification center 528 is illustrated as occurring within a windowed operating system, it is understood that similar or analogous notification or common messaging areas also occur in non-windowing OSes, mobile OSes, etc. It is understood that the above are merely a few illustrative examples to which the disclosed subject matter is not limited.

Figure 6:
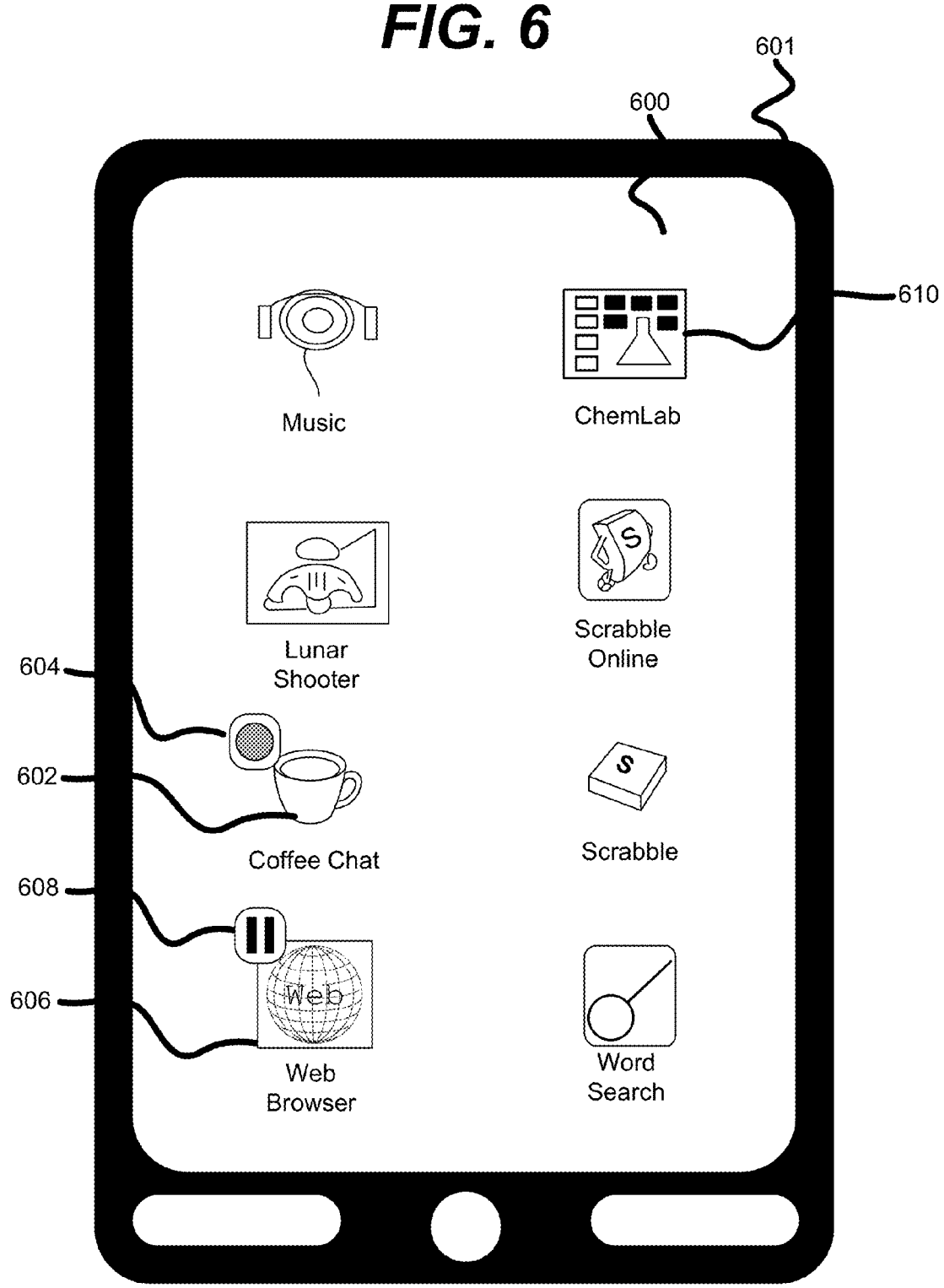
FIG. 6 is a diagram of an example embodiment of a graphical user interface in accordance with the disclosed subject matter.

FIG. 6 is a diagram of an example embodiment of a user interface (UI) 600 in accordance with the disclosed subject matter. In one embodiment, the UI 600 may be displayed on a monitor or screen of an apparatus 601. In some embodiments, the apparatus 601 may include a touch-sensitive mobile computing device (e.g., a tablet, smartphone, etc.). In another embodiment, the apparatus 601 may include another computing device (e.g., laptop, desktop computer, etc.). It is understood that the above are merely a few illustrative examples to which the disclosed subject matter is not limited.

In various embodiments, the UI 600 may include the display of a plurality of icons or application identifiers (IDs) (e.g., icons 602, 606, 610, etc.) associated with various respective applications. In the illustrated embodiment, two of those applications may be recording sound or associated with a gathered or recorded audio and/or visual signal. In such an embodiment, the association between the applications and their audio signals may be indicated by the sound or audio controller UIs 604 and 608.

In various embodiments, the sound or audio controller UIs 604 and 608 may indicate the state of the audio signals to the user. For example, in the illustrated embodiment, the sound or audio signal recorded by the web browser application (associated with icon 606) may be muted or paused. As such, the associated sound or audio controller UI 608 may indicate, while an audio signal is being recorded by the web browser, that the recording aspect is paused and no sound is being recorded from the device 601's microphone (or camera). Conversely, the sound or audio signal recorded by the chat application (associated with icon 602) may be active. As such, the associated sound or audio controller UI 604 may indicate that sound, captured by the microphone of the device 601, is being recorded by the chat application (e.g., illustrated by a red pulsating dot, etc.). Finally, for applications which are not associated with any audio signal (collectively represented by application icon or ID 610) there is no sound or audio controller UI displayed. It is understood that the above is merely one illustrative example to which the disclosed subject matter is not limited.

In various embodiments, the user may be able to manipulate the recording of the audio signal associated with each application by making use of the respective sound or audio controller UI 604 and/or 608. For example, in one embodiment, the user may be able to tap (in a touch screen implementation) or click (in a cursor-based implementation) the sound or audio controller UI 604 to pause the recording of the sound by the chat application. In another embodiment, the user may be able to tap or click the sound or audio controller UI 608 to un-pause the sound recorded by the web browser application. In yet another embodiment, the user may be able to tap/click and hold the sound or audio controller UI 604 to stop the recording of the sound by the chat application. In various embodiments, the user may be able to tap/click and drag (e.g., up and/or down, etc.) the sound or audio controller UI 604 to un-pause and change the recorded volume level (e.g., up or down, etc.) of the audio recorded by the chat application. It is understood that the above are merely a few illustrative examples to which the disclosed subject matter is not limited.

In various embodiments, the embodiment shown in FIG. 6 is may be useful for mobile devices, where screen real estate is generally limited. In such an embodiment, a larger UI (e.g., that shown in FIG. 3 or 4) may be too large for the limited screen real estate of a mobile device. In another embodiment, a UI similar to UI 600 may be employed on a device with a relatively, compared to the mobile device, to conserve screen real estate. It is understood that the above are merely a few illustrative examples of uses or advantages to which the disclosed subject matter is not limited.

It is understood that the illustrated UI 600 is merely one illustrative example of the sound or audio controller UIs to which the disclosed subject matter is not limited. In various embodiments, the sound or audio controller UI may change or display additional UI elements (e.g., a menu, a slider, etc.) based upon an action take or performed by a user (e.g., tap, double-click, drag, etc.). It is understood that the above are merely a few illustrative examples to which the disclosed subject matter is not limited.

FIG. 7 is a flow chart of an example embodiment of a technique in accordance with the disclosed subject matter. In various embodiments, the technique 700 may be used or produced by the systems such as those of FIG. 1. Furthermore, portions of technique 700 may involve or include the use of graphical user interfaces such as those of FIG. 3, 4, 5, or 6. Although, it is understood that the above are merely a few illustrative examples to which the disclosed subject matter is not limited. It is understood that the disclosed subject matter is not limited to the ordering of or number of actions illustrated by technique 700.

Block 702 illustrates that, in one embodiment, at least a portion of an application may be executed by a processor of a computing device, as described above. In various embodiments, the application may include a plurality of tabs, as described above. In such an embodiment, each tab may be associated with a respective document that is configured to be rendered for display by the application, as described above. In various embodiments, one or more of the action(s) illustrated by this Block may be performed by the apparatuses or systems of FIG. 1 or 8, the computer 101 or application 102 of FIG. 1, as described above.

Block 704 illustrates that, in one embodiment, it may be determined that a particular tab of the plurality of tabs is recording an audio and/or visual signal, as described above. In various embodiments, the audio and/or visual signal may be derived from an environment of the computing device, as described above. In some embodiments, determining may include determining that a plug-in is included with the application, and determining which tab of the application is included with the plug-in, as described above. In various embodiments, the plug-in may be associated or included with a plurality of tabs, as described above. In such an embodiment, determining may include receiving an indication from the plug-in as to which tab is included with the audio signal, as described above. In various embodiments, one or more of the action(s) illustrated by this Block may be performed by the apparatuses or systems of FIG. 1 or 8, the application 102 or plug-ins 120 or 122 of FIG. 1, as described above.

Block 706 illustrates that, in one embodiment, a graphical indication may be provided that indicates to a user of the computing device that the particular tab is recording the audio and/or visual signal, as described above. In various embodiments, the graphical indication may be associated with the particular tab, as described above. In various embodiments, providing the indication may include providing a graphical user interface on a label handle of the particular tab, as described above. In some embodiments, providing the indication may include providing the indication on a thumbnail handle of the particular tab, as described above. In another embodiment, providing a graphical indication associated with the particular tab may include displaying the graphical indication on an icon associated with the application, if the application is not displayed but is still executed by the processor of the computing device, as described above. In yet another embodiment, providing a graphical indication associated with the particular tab may include displaying the graphical indication within a notification center associated with an operating system executed by the processor of the computing device, as described above. In various embodiments, one or more of the action(s) illustrated by this Block may be performed by the apparatuses or systems of FIG. 1 or 8, the application 102 or audio/visual UI generator 116 of FIG. 1, as described above.

Block 708 illustrates that, in one embodiment, the audio and/or visual signal may be manipulated, as described above. In some embodiments, the manipulation may be based upon a command generated by the graphical indication in response to a user interaction, as described above. In various embodiments, one or more of the action(s) illustrated by this Block may be performed by the apparatuses or systems of FIG. 1 or 8, the application 102, audio/visual controller 114, or audio/visual UI generator 116 of FIG. 1, as described above.

Figure 8:
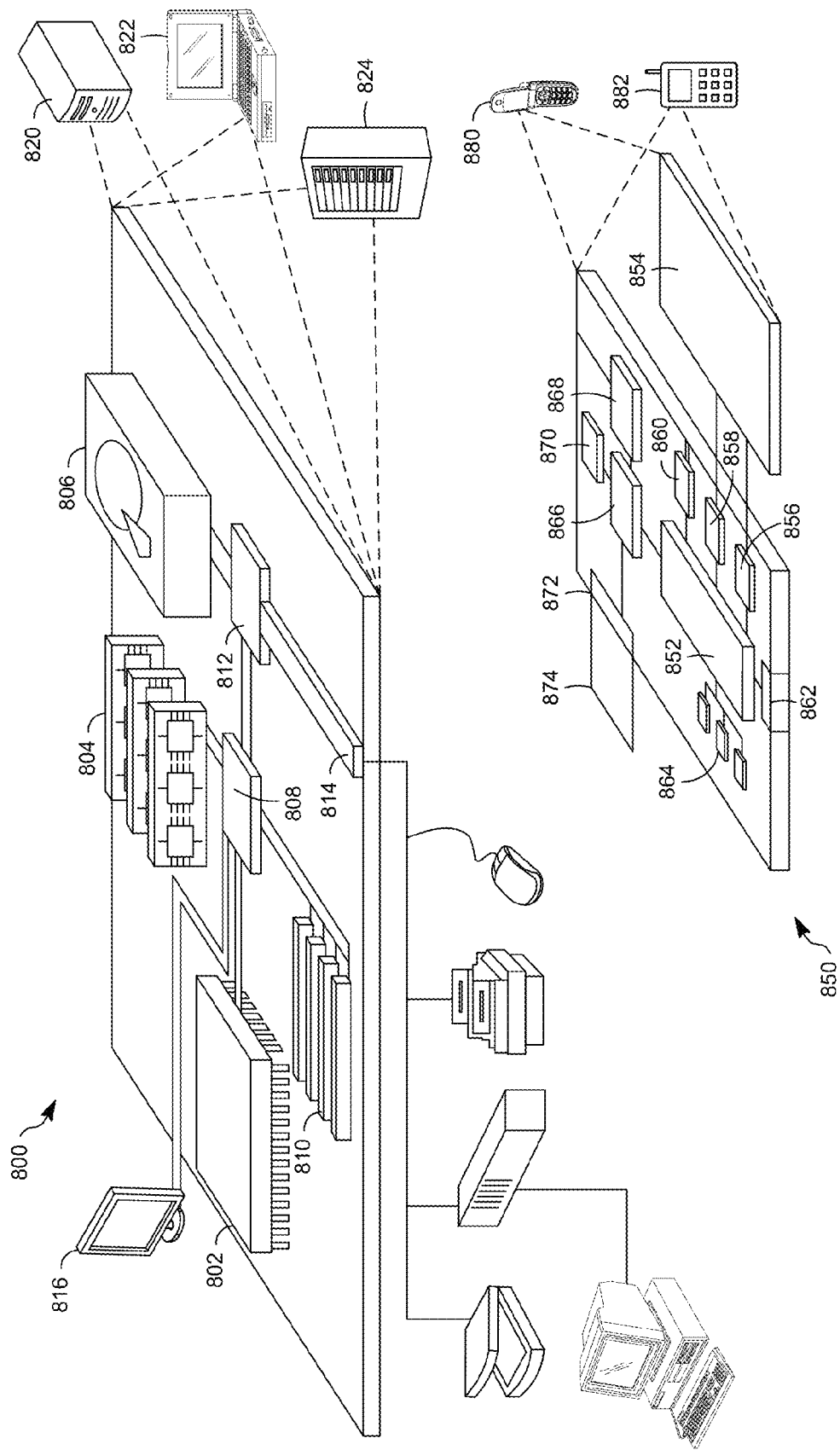
FIG. 8 is a block diagram of an example embodiment of a system in accordance with the disclosed subject matter.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may also include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   executing, by a processor of a computing device, at least a portion of a first application that includes a first tab and a second tab from a plurality of tabs, each of the plurality of tabs being associated with a respective document that is configured to be rendered for display by the first application;
   accessing a permission setting for the first tab, the permission setting being a permission to record an audio and/or visual signal;
   determining the permission to record the audio and/or visual signal for the first tab of the plurality of tabs based on the permission setting;
   in response to determining the first tab of the plurality of tabs has the permission to and a second application is recording the audio and/or visual signal, providing a graphical indication, associated with the first tab and visible when a label handle for the first tab is visible, visible when the second tab is in focus and visible when the first tab is not in focus, the graphical indication indicates to a user of the computing device that the first tab is recording the audio and/or visual signal; and
   triggering a display of the graphical indication within a notification center associated with an operating system executed by the processor of the computing device when the label handle for the first tab is hidden.

2. The method of claim 1, wherein providing the indication includes providing a graphical user interface on the label handle of the first tab.

3. The method of claim 1, wherein providing the indication includes providing the indication on a thumbnail handle of the first tab.

4. The method of claim 1, wherein:
   the second application is a plug-in included with the first application; and
   the method further includes determining that the first tab of the first application is associated with the plug-in.

5. The method of claim 4, wherein the plug-in is included with the plurality of tabs, and wherein determining the first tab includes receiving an indication from the plug-in as to which tab is included with the audio signal.

6. The method of claim 1, wherein providing of the graphical indication associated with the first tab includes displaying the graphical indication on an icon associated with the second application, if the second application is not displayed but is still executed by the processor of the computing device.

7. The method of claim 1, further including manipulating the audio and/or visual signal, based upon a command generated by the graphical indication in response to a user interaction.

8. The method of claim 1, wherein the audio and/or visual signal is derived from an environment of the computing device.

9. The method of claim 1, wherein:
   the permission setting for the first tab is stored as a list of permissions including a permission for each of the plurality of tabs,
   the list of permissions is associated with an audio controller of the first application, and
   the list of permissions is stored on the computing device.

10. A method, comprising:
   executing, by a processor of a computing device, at least a first application that includes a first tab and a second tab from a plurality of tabs, each of the plurality of tabs being associated with a respective document that is configured to be rendered for display by the first application;
   receiving a message including,
      a tab identifier indicating which of the plurality of tabs is associated with an audio and/or visual signal, and
      an audio signal identifier indicating which of a plurality of audio and/or visual signals is the audio and/or visual signal associated with the message;
   in response to receiving the message, accessing a permission setting for the first tab based on the tab identifier, the permission setting being a permission to record the audio and/or visual signal;
   determining, via the permission setting for the first tab, that the first tab has the permission to record audio via a microphone;
   providing a graphical indication, associated with the first tab and visible when the second tab is in focus, visible when a label handle for the first tab is visible and visible when the first tab is not in focus, the graphical indication indicates to a user of the computing device that the first tab is recording the audio and/or visual signal corresponding to the audio signal identifier; and triggering a display of the graphical indication within a common area of the first application when the label handle for the first tab is hidden.

11. The method of claim 10, further comprising providing the indication on a thumbnail handle of the first tab.

12. The method of claim 10, further comprising providing a graphical user interface on the label handle of the first tab.

13. The method of claim 10, further comprising:
determining that the message is received from a plug-in included with the first application; and
determining which of the plurality of tabs of the first application is associated with the plug-in based on the tab identifier.

14. The method of claim 10, further comprising displaying the graphical indication on an icon associated with a second application, if the second application is not displayed but is still executed by the computing device.

15. The method of claim 10, further comprising manipulating the audio signal, based upon a command generated by the graphical indication in response to a user interaction.

16. The method of claim 10, further comprising:
determining, via the permission setting for the first tab, the permission to record video from the environment.

17. The method of claim 10, further comprising:
receiving an indicator that the first tab has been closed;
receiving an indicator that a third tab including a web page associated with the first tab has been opened; and
setting a permission setting for the third tab based on the permission setting for the first tab.

18. A non-transitory computer-readable medium including executable code of a machine-executable program which, when executed, is configured to cause an apparatus to:
execute, by a processor of the apparatus, a first application that includes a first tab and a second tab from a plurality of tabs, each of the plurality of tabs being associated with a respective document that is configured to be rendered for display by the first application;
accessing a permission setting for the first tab, the permission setting being a permission to record an audio and/or visual signal, the permission setting not being for the second tab;
determine the permission to record the audio and/or visual signal for the first tab of the plurality of tabs based on the permission setting;
provide a graphical indication, associated with the first tab and visible when the second tab is in focus visible when a label handle for the first tab is visible, and visible when the first tab is not in focus, the graphical indication indicates to a user of the apparatus that the first tab is recording the audio and/or visual signal; and
trigger a display of the graphical indication within a notification center associated with an operating system executed by the processor of the apparatus when the label handle for the first tab is hidden.

19. The computer-readable medium of claim 18, wherein the machine-executable program which, when executed, is configured to cause the apparatus to:
provide a graphical user interface on the label handle of the first tab.

* * * * *